United States Patent
Yamada

(10) Patent No.: US 7,796,019 B2
(45) Date of Patent: Sep. 14, 2010

(54) VEHICULAR DISPLAY CONTROL DEVICE

(75) Inventor: Syuuji Yamada, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 311 days.

(21) Appl. No.: 12/071,875

(22) Filed: Feb. 27, 2008

(65) Prior Publication Data

US 2008/0211647 A1 Sep. 4, 2008

(30) Foreign Application Priority Data

Mar. 2, 2007 (JP) ............... 2007-052744

(51) Int. Cl.
*B60Q 1/00* (2006.01)
(52) U.S. Cl. ............... 340/438; 340/439; 340/441; 340/461; 701/29
(58) Field of Classification Search ............... 340/438, 340/439, 441, 442, 449, 450, 455, 457, 457.1, 340/457.2, 457.3, 457.4, 461, 984; 707/1; 701/29, 30, 31, 33, 36
See application file for complete search history.

(56) References Cited

U.S. PATENT DOCUMENTS

| 6,289,332 | B2 * | 9/2001 | Menig et al. ............... 707/1 |
| 6,603,393 | B2 * | 8/2003 | Sumada et al. ............ 340/425.5 |
| 7,391,305 | B2 * | 6/2008 | Knoll et al. ............... 340/438 |
| 7,427,914 | B2 * | 9/2008 | Plantamura ............... 340/438 |
| 2008/0174415 | A1 * | 7/2008 | Tanida et al. ............... 340/438 |

FOREIGN PATENT DOCUMENTS

| JP | A-62-039714 | 2/1987 |
| JP | U-02-054753 | 4/1990 |
| JP | A-05-260605 | 10/1993 |
| JP | A-10-236243 | 9/1998 |
| JP | A-2002-002418 | 1/2002 |
| JP | A-2002-046505 | 2/2002 |
| JP | A-2002-236955 | 8/2002 |
| JP | A-2003-022330 | 1/2003 |
| JP | A-2004-203197 | 7/2004 |
| JP | A-2005-049914 | 2/2005 |
| JP | A-2006-017652 | 1/2006 |

OTHER PUBLICATIONS

Feb. 5, 2010 Chinese Office Action for Chinese Patent Application No. 200810081370.7 (with English translation).

* cited by examiner

*Primary Examiner*—Toan N Pham
(74) *Attorney, Agent, or Firm*—Oliff & Berridge, PLC

(57) ABSTRACT

When an event arises in which at least one of a driver and a passenger of a vehicle needs to be warned of a situation of the vehicle, a first determining unit determines contents of a warning, and a second determining unit determines a risk level of the problematic situation based on the contents of the warning determined by the first determining unit. A display control unit displays information on the situation of the vehicle on display in an interrupting manner in a display mode that is set according to the risk level.

3 Claims, 7 Drawing Sheets

| RISK LEVEL | LOW RISK | MODERATE RISK | HIGH RISK |
|---|---|---|---|
| DISPLAY MODE | WARNING DISPLAYED UNTIL CANCELLED BY USER | WARNING DISPLAYED REPETITIVELY UNTIL PROBLEM IS RESOLVED | WARNING DISPLAYED CONTINUOUSLY UNTIL PROBLEM IS RESOLVED |
| PROBLEMATIC SITUATION | · RIDING WITHOUT FASTENING SEATBELT<br>· RIDING WITH HAND BRAKE APPLIED<br>· RIDING WITH FLASHERS ON<br>· RIDING WITH TURN INDICATOR LAMP ON<br>· LOW FUEL ·········· (TRAVEL DISTANCE, ENGINE STATUS)<br>· LOW OIL / OIL DETERIORATION ·········· (TRAVEL DISTANCE, ENGINE STATUS)<br>· LOW WASHER FLUID ·········· (NUMBER OF TIMES OF USAGE)<br>· LOW BATTERY CHARGE ·········· (REMAINING BATTERY CHARGE) | · INCREASE IN COOLANT TEMPERATURE<br>· INCREASE IN EXHAUST TEMPERATURE | · RIDING WITH HALF-SHUT DOOR<br>· RIDING WITH HALF-SHUT HOOD |

FIG.2

VEHICULAR DISPLAY CONTROL DEVICE

BACKGROUND OF THE INVENTION

1. Field of the Invention

The present invention relates to a vehicular display control device that controls display contents to be provided to a driver of a vehicle, and more particularly, to a vehicular display control device that informs the driver of an appropriate warning according to a risk level of a problematic situation of the vehicle.

2. Description of the Related Art

Conventionally, vehicles are equipped with a plurality of indicators that keep the passengers riding in a vehicle updated about various situations such as the remaining amount of vehicle fuel or status of turn indicator lamps.

With the advent of car navigation systems with inbuilt display, a technology to display information and warnings on the inbuilt display is becoming prevalent.

A car navigation system can be used to display more detailed information about various situations as compared to conventional indicators. Moreover, the displayed information can be varies according depending on the transition in the situations. For example, Japanese Patent Application Laid-Open No. 2006-17652, Japanese Patent Application Laid-Open No. 2002-46505, Japanese Patent Application Laid-Open No. 2002-236955, and Japanese Patent Application Laid-Open No. H10-236243 disclose techniques for repetitively displaying a warning about a problematic situation until the problem is resolved.

By using the abovementioned technology, passengers riding in a vehicle can be updated about various problematic situations such as low fuel or continuous flashing of a turn indicator lamp. Although the passengers need to be warned about each problematic situation, the risk level of each problem is different if a vehicle is driven with the problem unresolved. For example, while riding in a vehicle, the risk level for low fuel is different than the risk level for a half-shut door.

Thus, it is necessary not only to inform the passengers about a problematic situation but also to warn how risky it is to ride in a vehicle without resolving the problem.

However, in a conventional technology, a warning issued to the passengers does not vary according to the risk level of each problematic situation. As a result, in the case of a high risk situation, there is a possibility that a passenger ignores the warning by cancelling the warning display and continues to ride in the vehicle without resolving the problem. On the other hand, in the case of a low risk situation, there is a possibility that a passenger cannot purposely cancel the warning display after reading the warning or the warning is repetitively displayed after being canceled.

SUMMARY OF THE INVENTION

It is an object of the present invention to at least partially solve the problems in the conventional technology.

According to an aspect of the present invention, there is provided a vehicular display control device including a first determining unit that determines contents of a warning, when an event arises in which at least one of a driver and a passenger of a vehicle needs to be warned of a situation of the vehicle; a second determining unit that determines a risk level of the problematic situation based on the contents of the warning determined by the first determining unit; and a display control unit that displays information on the situation of the vehicle on display in an interrupting manner in a display mode that is set according to the risk level.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an exemplary diagram for explaining a plurality of problematic situations that may arise in a vehicle, risk levels for those situations, and display modes for the risk levels;

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
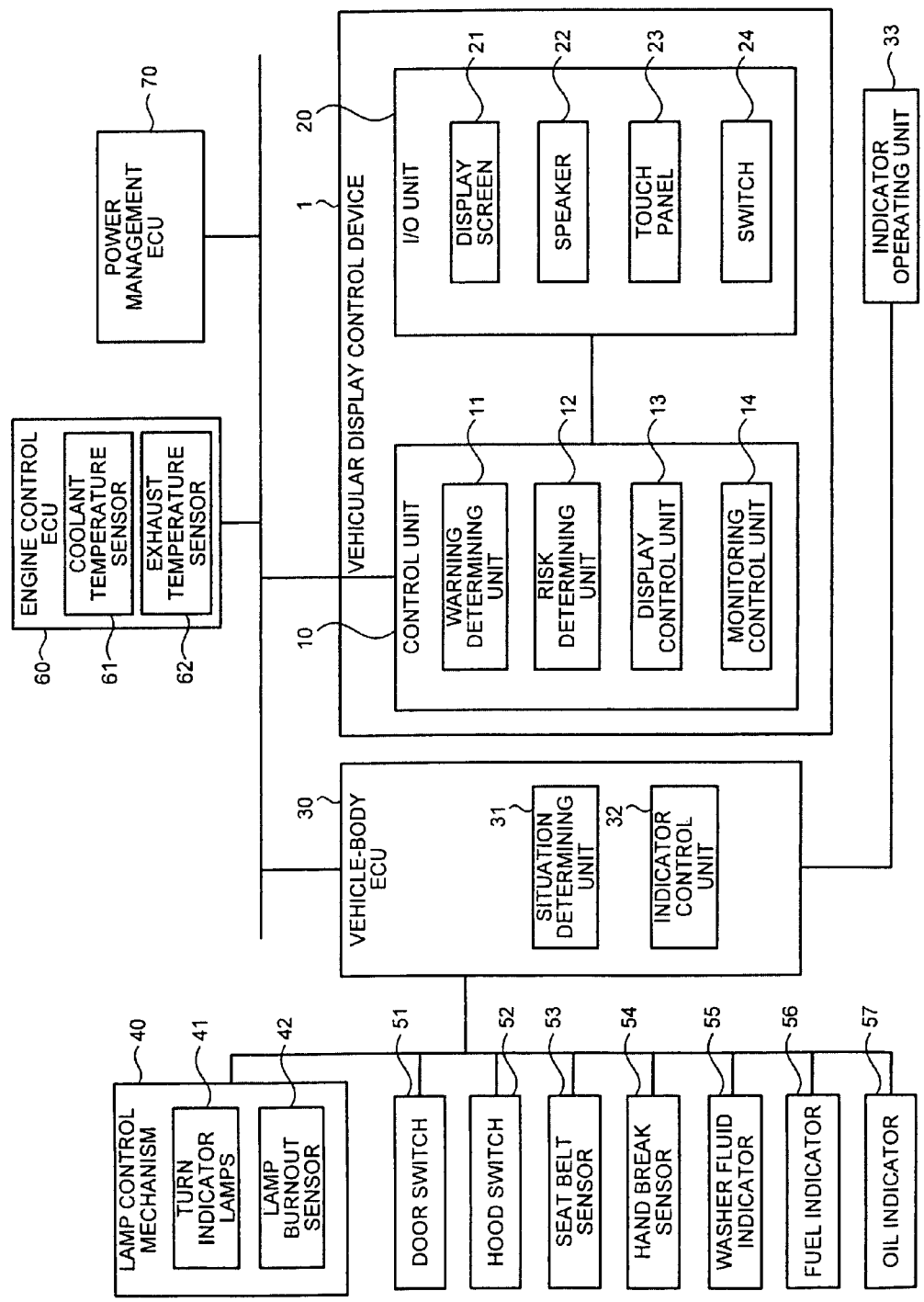
FIG. 1 is a schematic diagram of a vehicular display control device according to a first embodiment of the present invention.

FIG. 1 is a schematic diagram of a vehicular display control device according to a first embodiment of the present invention. The vehicular display control device 1 is connected to a vehicle-body electronic control unit (ECU) 30, an engine control ECU 60, and a power management ECU 70 via a bus network.

The power management ECU 70 manages a vehicle battery and transmits the battery power over the bus network.

The engine control ECU 60 controls the engine operations depending on the use of an accelerator pedal in the vehicle. The engine control ECU 60 includes a coolant temperature sensor 61 and an exhaust temperature sensor 62, and transmits information regarding the coolant temperature and the exhaust temperature of the vehicle over the bus network.

The vehicle-body ECU 30 controls the operations of various equipments and functions provided on the vehicle body. The vehicle-body ECU 30 is connected with a lamp control mechanism 40, a door switch 51, a hood switch 52, a seat belt sensor 53, a hand break sensor 54, a washer fluid indicator 55, a fuel indicator 56, an oil indicator 57, and an indicator operating unit 33.

The lamp control mechanism 40 controls operations of a plurality of lamps provided on the vehicle. The lamps include turn indicator lamps 41 (i.e., winker lamps), brake lamps (not shown), and head lamps (not shown). Moreover, the lamp control mechanism 40 includes a lamp burnout sensor 42 for detecting burned-out lamps.

The door switch 51 switches between an OFF state when a vehicle door is open and an OFF state when a vehicle door is closed. Similarly, the hood switch 52 switches between an ON state when the vehicle hood is open and an OFF state when the vehicle hood is closed.

The seat belt sensor 53 informs the vehicle-body ECU 30 whether seat belts are fastened. Similarly, the hand break sensor 54 informs the vehicle-body ECU whether the hand break is applied.

The washer fluid indicator 55 informs the vehicle-body ECU 30 when the amount of washer fluid falls below a specific amount. Similarly, the fuel indicator 56 informs the vehicle-body ECU 30 when the amount of vehicle fuel (e.g., gasoline) falls below a specific amount. The oil indicator 57 informs the vehicle-body ECU 30 when the amount of vehicle oil falls below a specific amount.

The vehicle-body ECU 30 includes a situation determining unit 31 and an indicator control unit 32. The situation determining unit 31 obtains various information from the power management ECU 70, the engine control ECU 60, the lamp control mechanism 40, the door switch 51, the hood switch 52, the seat belt sensor 53, the hand break sensor 54, the washer fluid indicator 55, the fuel indicator 56, and the oil indicator 57, and determines whether a problematic situation has arisen in the vehicle for which passengers riding in the vehicle need to be warned.

When the situation determining unit 31 determines it necessary to issue a warning to the passengers, the indicator control unit 32 controls the indicator operating unit 33 to switch ON an indicator corresponding to the problematic situation. The indicator control unit 32 also transmits details of the warning over the bus network.

The vehicular display control device 1 includes a control unit 10 and an input-output (I/O) unit 20. The I/O unit 20 further includes a display screen 21 for displaying various information to the passengers, a speaker 22 for outputting voice information to the passengers, a touch panel 23 from which the passengers can input instructions, and a switch 24.

The control unit 10 controls the operations of the I/O unit 20. More particularly, depending on instructions from the passengers or operating conditions of other equipments in the vehicle, the control unit 10 controls the I/O unit 20 to output information by using the display screen 21 and the speaker 22. The control unit 10 can control, e.g., car navigation and inform the passengers about routes to a destination or facilities in the vicinity of current location of the vehicle.

Moreover, the control unit 10 monitors the information transmitted over the bus network. After the vehicle-body ECU 30 transmits details of a warning over the bus network, the control unit 10 obtains the details and pops up the warning over other information being displayed on the display screen 21.

The control unit 10 includes a warning determining unit 11, a risk determining unit 12, a display control unit 13, and a monitoring control unit 14. The warning determining unit 11 monitors the bus network and determines a warning from the information being transmitted over the bus network.

The risk determining unit 12 determines a risk level for a problematic situation described in the details of a warning. The display control unit 13 controls displaying the warning on the display screen 21 based on a display mode set corresponding to the risk level.

When a warning is to be issued about a problematic situation, the monitoring control unit 14 starts monitoring that particular situation and varies the risk level depending on the transition in the situation.

Given below is the description about a plurality of problematic situations that may arise in a vehicle, risk levels for those situations, and display modes for the risk levels with reference to FIG. 2. As shown in FIG. 2, situations such as riding in a vehicle without fastening a seatbelt, riding in a vehicle while keeping the hand brake in an applied state, riding in a vehicle while keeping flashers ON, and riding in a vehicle while keeping a turn indicator lamp ON are determined to be low-risk situations.

On the other hand, a situation such as increase in the coolant temperature or the exhaust temperature is determined to be a moderate-risk situation, while a situation such as riding in a vehicle while keeping a door or the vehicle hood half-shut is determined to be a high-risk situation.

Meanwhile, a situation such as low fuel, low oil, oil deterioration, low washer fluid, or low battery charge is initially determined to be a low-risk situation. Even if such a situation arises, the control unit 10 has some leeway in switching the corresponding indicator ON such that the passengers are warned about the situation. However, the risk level of such a situation changes to moderate or high if the situation gets worse in the course of time.

For example, in the case of low fuel, the monitoring control unit 14 first determines the situation to be a low-risk situation, starts monitoring the travel distance or the engine status, and varies the risk level to moderate or high depending on the monitoring result.

Similarly, in the case of low oil or oil deterioration, the monitoring control unit 14 first determines the situation to be a low-risk situation, starts monitoring the travel distance or the engine status, and varies the risk level to moderate or high depending on the monitoring result. In the case of low washer fluid, the monitoring control unit 14 first determines the situation to be a low-risk situation, monitors the number of times for which the washer fluid is consumed thereafter, and varies the risk level to moderate or high as the amount of washer fluid further decreases. Similarly, in the case of low battery charge, the monitoring control unit 14 first determines the situation to be a low-risk situation, monitors the amount of battery charge consumed thereafter, and varies the risk level to moderate or high as the battery charge further decreases.

In the case of a display mode for a low-risk situation, a warning pops up over other information being displayed on the display screen 21. However, it is possible for a passenger to cancel the warning display from the display screen 21. The warning is not redisplayed thereafter.

In the case of a display mode for a moderate-risk situation, after a warning pops up over other information being displayed on the display screen 21, it is possible for a passenger to temporarily cancel the warning display. However, the warning is repetitively displayed on the display screen 21 after, e.g., a specific time interval or a specific travel distance until the problem is resolved.

In the case of a display mode for a high-risk situation, a warning pops up over other information being displayed on the display screen 21. Moreover, a passenger is not able to cancel the warning display. That is, the warning is continuously displayed until the problem is resolved.

Figure 3:
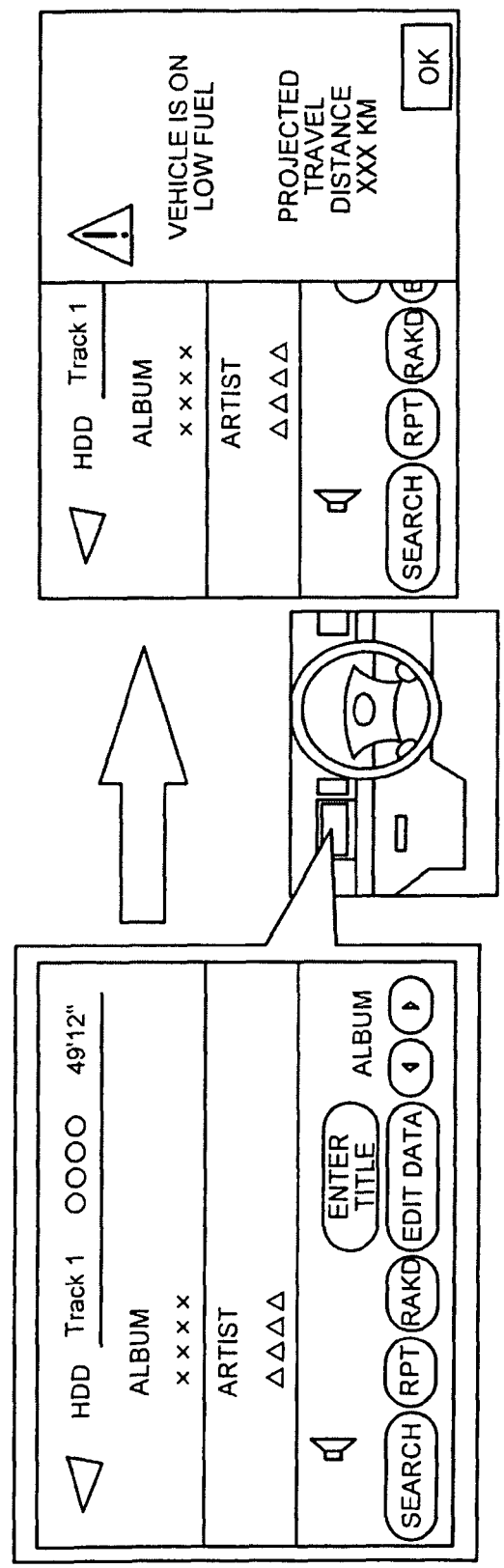
FIG. 3 is an exemplary diagram for explaining a warning that pops up over other information being displayed on a display screen.

FIG. 3 is an exemplary diagram for explaining a warning that pops up over other information being displayed on a display screen. The display screen in FIG. 3 is originally shown to be displaying a music playback screen as selected by the passengers. However, when, e.g., the vehicle fuel falls below a specific amount (a low fuel situation), a warning pops up over the music playback screen. That is, the display of the music playback screen is interrupted by the warning display.

The warning informs the passengers that the vehicle is on low fuel as well as projects a possible travel distance in the current low fuel situation. Moreover, if the situation is determined to be a low-risk situation or a moderate-risk situation, an OK button is provided on the warning such that the passengers can touch the OK button to at least temporarily cancel the display after reading the warning.

Figure 4:
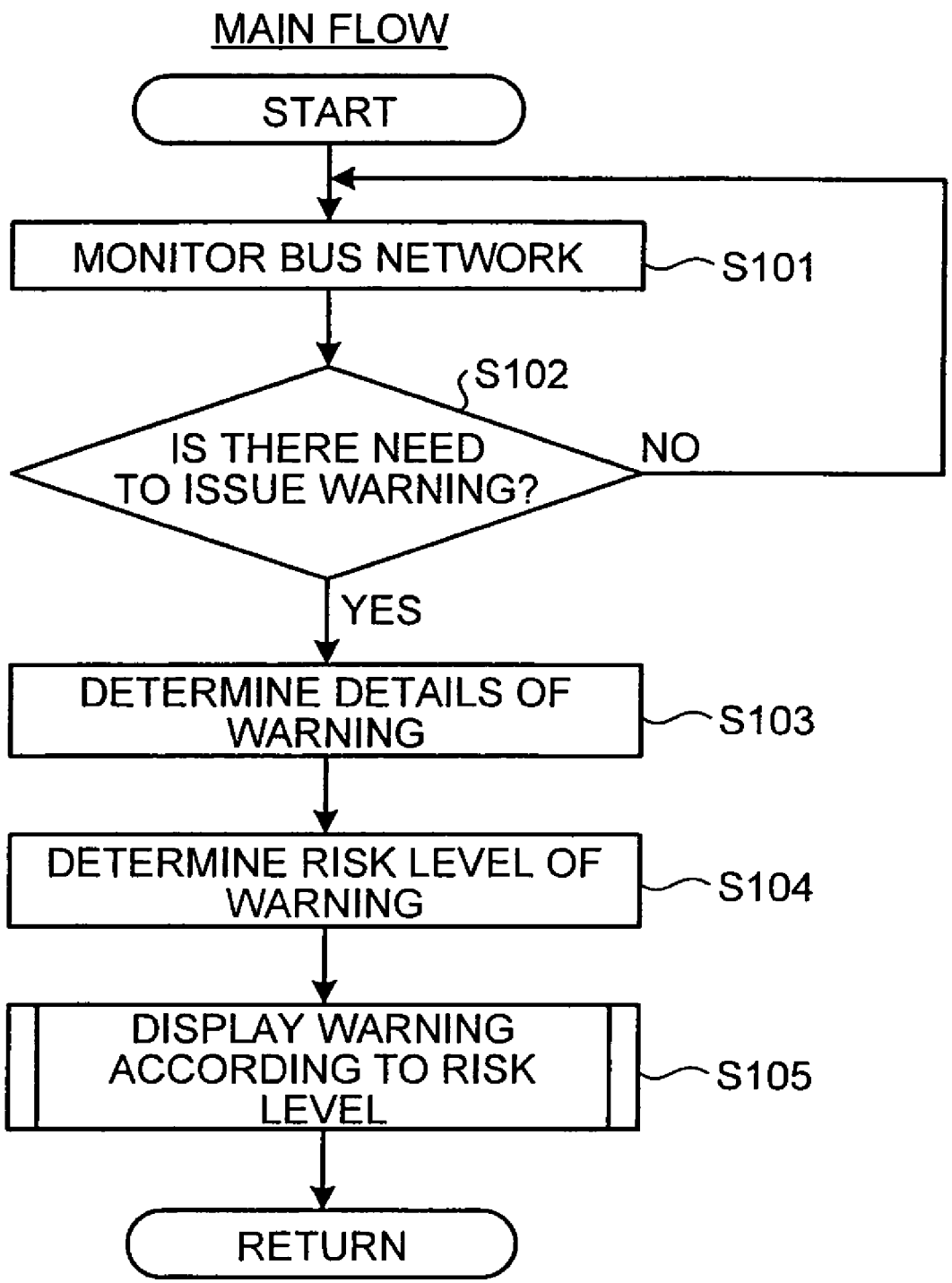
FIG. 4 is a flowchart for explaining the overall operations performed by the vehicular display device control unit.

FIG. 4 is a flowchart for explaining the overall operations performed by the control unit 10.

First, the control unit 10 monitors the information transmitted over the bus network (Step S101). When a warning is transmitted by the vehicle-body ECU 30 over the bus network (Yes at Step S102), the warning determining unit 11 determines the details of that warning (Step S103). The risk determining unit 12 then determines a risk level for a problematic situation described in the details of the warning (Step S104). The display control unit 13 controls displaying the warning on the display screen 21 based on a display mode set corresponding to the risk level (Step S105). The system control then returns to Step S101.

Figure 5:
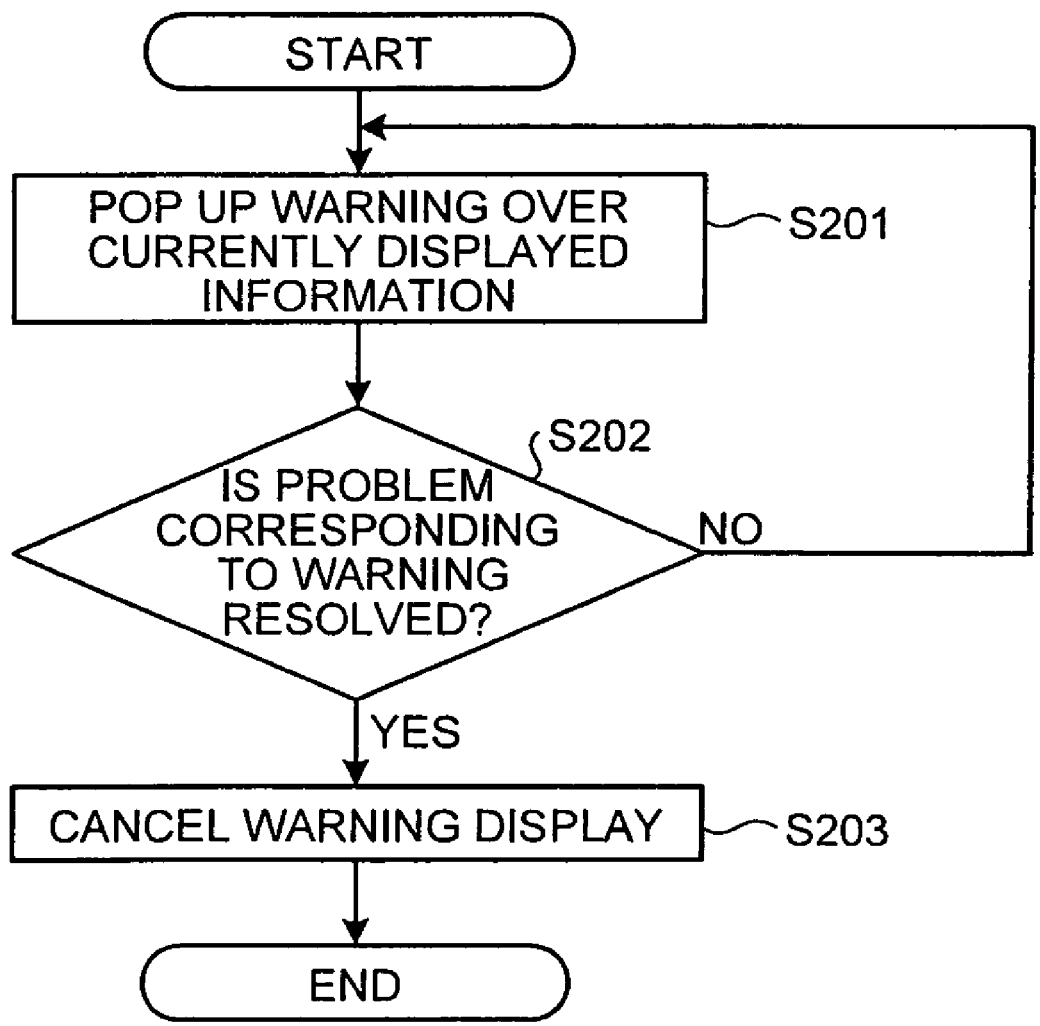
FIG. 5 is a flowchart for explaining the operations performed by the vehicular display device control unit when the risk level of a problematic situation is determined to be high.

The process of displaying a warning on the display screen 21 differs for each risk level, viz., low, moderate, and high. When the risk level is determined to be high as shown in FIG. 5, the display control unit 13 first pops up a warning over other information being displayed on the display screen 21 (Step S201) and keeps displaying the warning. When the problem corresponding to the warning is resolved (Yes at Step S202), the display control unit 13 cancels the warning display (Step S203).

Figure 6:
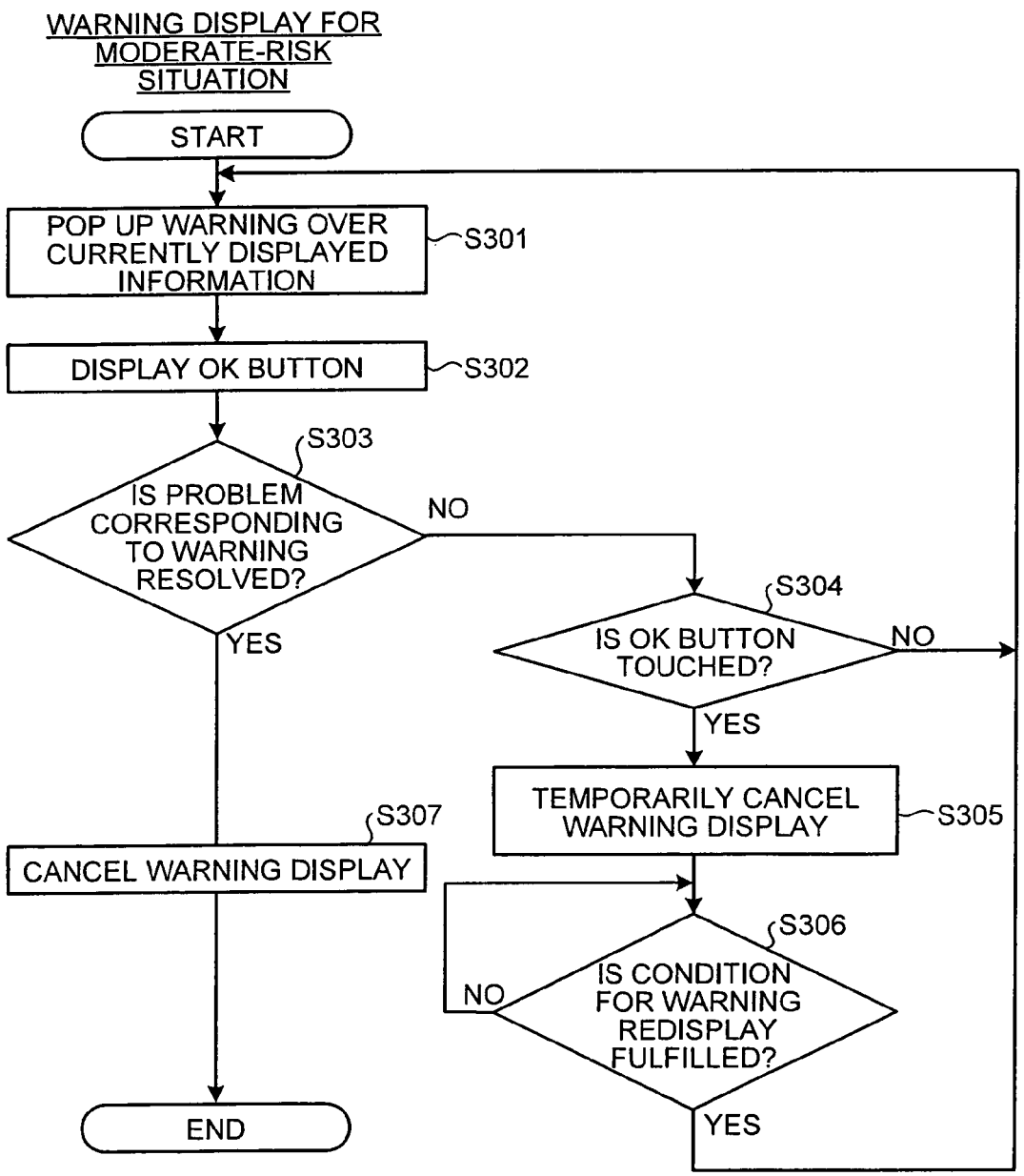
FIG. 6 is a flowchart for explaining the operations performed by the vehicular display device control unit when the risk level of a problematic situation is determined to be moderate.

When the risk level is determined to be moderate as shown in FIG. 6, the display control unit 13 first pops up a warning over other information being displayed on the display screen 21 (Step S301) and provides an OK button on the warning display such that the passengers can temporarily cancel the warning display after reading the warning (Step S302).

When the problem corresponding to the warning is resolved (Yes at Step S303), the display control unit 13 cancels the warning display (Step S307).

However, when the problem corresponding to the warning is not resolved (No at Step S303), the display control unit 13 determines whether the OX button is touched (Step S304). If the OK button is not touched (No at Step S304), the system control returns to Step S301 and the warning is kept displayed on the display screen 21.

If the OK button is touched (Yes at Step S304), the warning display is temporarily cancelled (Step S305). After a certain condition such as a specific time interval or a specific travel distance is satisfied (Yes at Step S306), the system control returns to Step S301 and the warning is redisplayed on the display screen 21.

Figure 7:
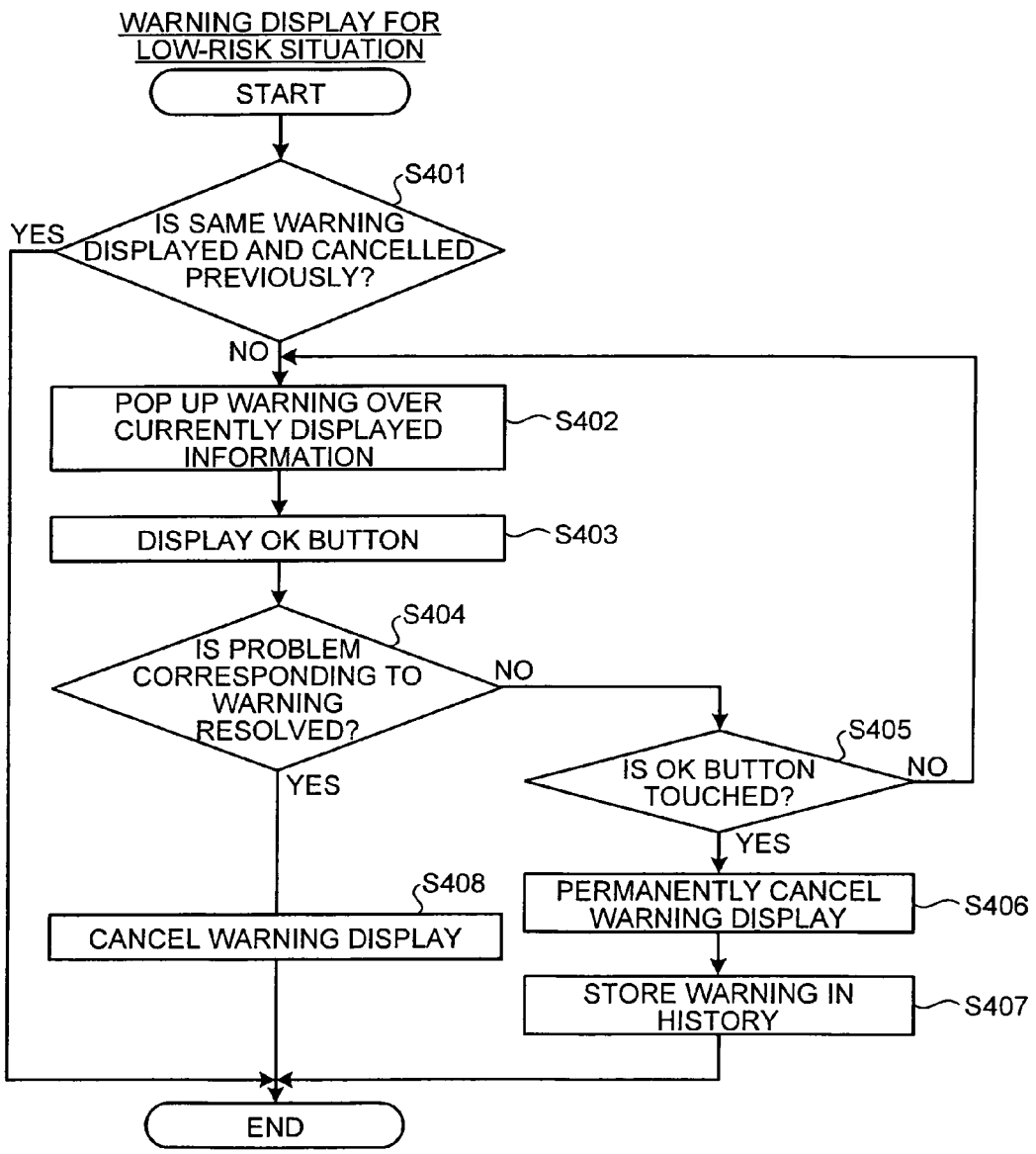
FIG. 7 is a flowchart for explaining the operations performed by the vehicular display device control unit when the risk level of a problematic situation is determined to be low.

When the risk level is determined to be low as shown in FIG. 7, the display control unit 13 first determines whether a warning has been previously displayed and cancelled (Step S401). Only when the warning is not previously displayed (No at Step S401), the display control unit 13 pops up the warning over other information being displayed on the display screen 21 (Step S402) and provides an OX button on the warning display such that the passengers can permanently cancel the warning display after reading the warning (Step S403).

When the problem corresponding to the warning is resolved (Yes at Step S404), the display control unit 13 cancels the warning display (Step S408).

When the problem corresponding to the warning is not resolved (No at Step S404), the display control unit 13 first determines whether the OK button is touched (Step S405). If the OK button is not touched (No at Step S405), the system control returns to Step S402 and the warning is kept displayed on the display screen 21.

If the OK button is touched (Yes at Step S405), the display control unit 13 cancels the warning display (Step S406) and stores the history of displaying the warning and then cancelling the warning display (Step S407). Such history is stored for each displayed warning and deleted after a predetermined amount of time. The vehicular display control device 1 can be configured to delete such history at the time of, e.g., switching OFF the engine or turning the power of the vehicle ON for first time in a day.

To sum up, the vehicular display control device 1 according to the first embodiment detects a problematic situation in a vehicle, determines the risk level corresponding to the situation, and issues a warning to the passengers by using a display mode appropriate for the determined risk level.

Thus, when a high-risk situation such as riding in a vehicle while keeping a door or the vehicle hood half-shut arises, the warning is continuously displayed without allowing the passengers to cancel the warning display. On the other hand, when a low-risk situation such as riding in a vehicle without fastening a seatbelt arises, the passengers are allowed to cancel the warning display.

As a result, it is possible to correctly warn the passengers about the risk level of a problematic situation thereby improving the reliability of the vehicular display control device 1 and contributing to driving safety.

Moreover, e.g., in the case of low oil or oil deterioration, the risk level keeps changing depending on the remaining amount of the oil or the degree of oil deterioration, respectively. Thus, as soon as such situations arise, the travel distance or the engine status is continuously monitored such that the risk level can be varied according to the changing monitoring results. Such a configuration facilitates in simplifying the monitoring mechanism as well as achieving efficient monitoring.

In addition to detecting a burned-out lamp by using the lamp control mechanism 40, a warning can be displayed to inform the passengers about the burned-out lamp. Moreover, if the burned-out lamp happens to be a head lamp, it is possible to vary the risk level depending on the time of day.

Furthermore, the risk levels are not limited to low, moderate, and high, and can be appropriately set along with the corresponding display modes.

Moreover, instead of controlling the display screen 21, the vehicular display control device 1 can be configured to control an external display device.

As described above, according to an aspect of the present invention, it is possible to control the display of a warning according to the risk level of a problematic situation and hence contribute to driving safety.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display control device comprising:
   a first determining unit that determines contents of a warning, when an event arises in which at least one of a driver and a passenger of a vehicle needs to be warned of a situation of the vehicle;
   a second determining unit that determines a risk level of a problematic situation based on the contents of the warning determined by the first determining unit; and
   a display control unit that displays information on the situation of the vehicle on display in an interrupting manner in a display mode that is set according to the risk level, wherein the risk level includes a first risk level, a second risk level, and a third risk level, the display mode includes:
- a first display mode in which the at least one of the driver and the passenger is not allowed to cancel a display of the information,
- a second display mode in which the at least one of the driver and the passenger is allowed to temporarily cancel the display of the information, so that the information is redisplayed later, and
- a third display mode in which the at least one of the driver and the passenger is allowed to permanently cancel the display of the information, so that the information is not redisplayed, and the first, second, and third display modes correspond to the first, second, and third risk levels, respectively.

2. The vehicular display control device according to claim 1, further comprising a monitoring control unit that starts a monitoring of a transition of the situation, when the event arises, wherein
- the second determining unit changes the risk level according to the transition of the situation obtained from the monitoring.

3. The vehicular display control device according to claim 1, further comprising a monitoring control unit that starts a monitoring of a transition of the situation, when the event arises, wherein
- the second determining unit changes the risk level according to the transition of the situation obtained from the monitoring.

* * * * *